Patented Nov. 7, 1950

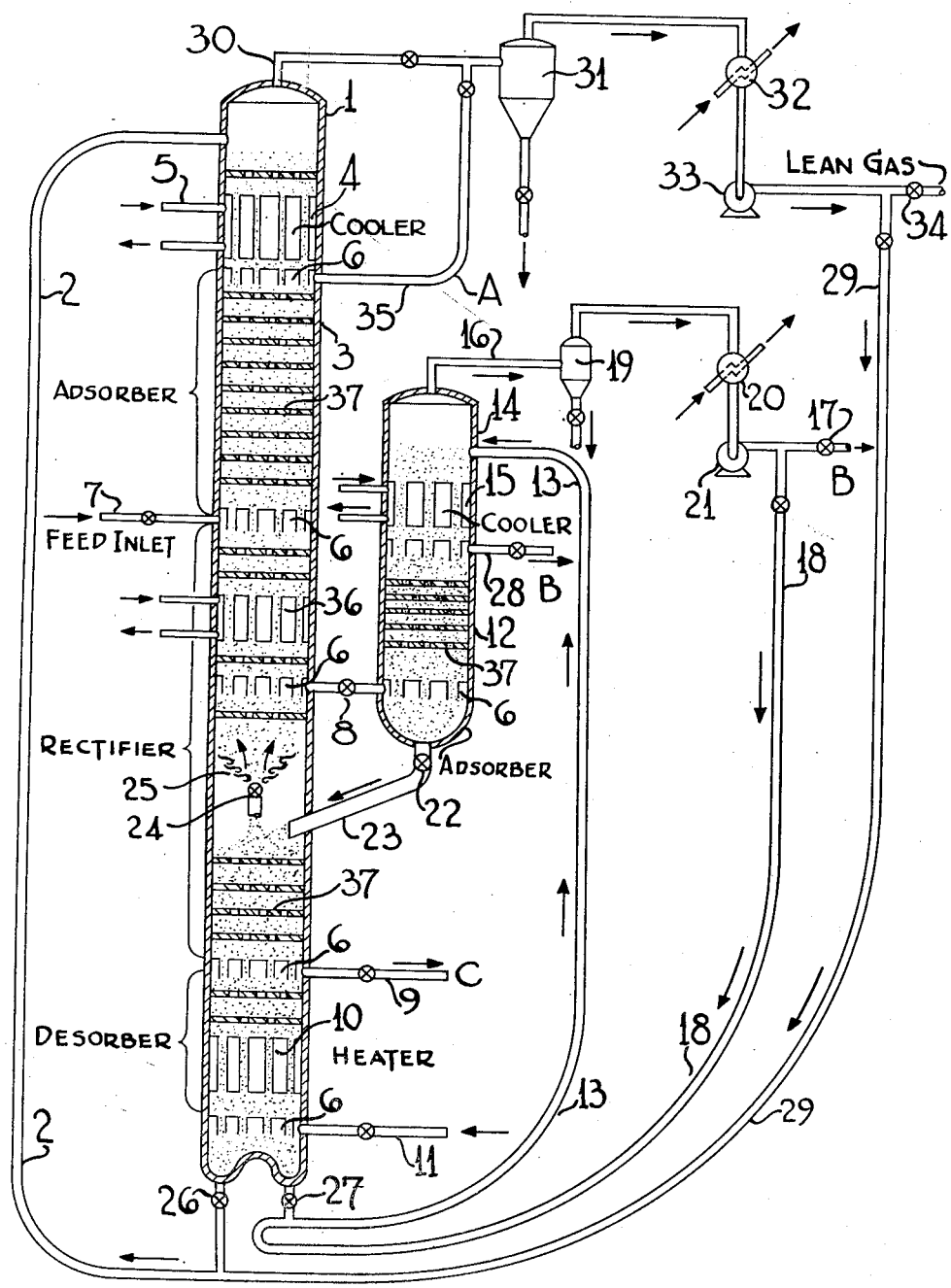

2,529,289

UNITED STATES PATENT OFFICE 2,529,289

PREPARATION OF AN INTERMEDIATE FRACTION WITH SOLID ADSORBENTS

Edwin R. Gilliland, Arlington, Mass., assignor to Standard Oil Development Company, a corporation of Delaware Application January 9, 1947, Serial No. 721,113

15 Claims. (Cl. 183—114.2)

This invention relates to improvements in the art of fractionating mixtures by countercurrent contact of mixed vapors with moving masses of solid adsorbent particles. It applies especially to the fractionation of gaseous or vaporous mixtures of hydrocarbons.

The fractionation of a gaseous mixture by causing it to flow upwardly through an adsorption zone where it contacts an adsorbent material such as silica gel or carbon in small particle or powdered form which is passed downwardly through this zone has been already described. The adsorbent leaving the bottom of the adsorption zone is heated, with or without contact with a stripping gas such as steam, to desorb the adsorbed component of the gas, which is separately recovered. The stripped adsorbent is then cooled and returned to the top of the adsorption zone for re-use.

In such operation the adsorbent can be caused to exercise highly selective action in removing more readily adsorbed materials, such as hydrocarbons of higher boiling point, substantially completely from mixtures containing less readily adsorbed materials, such as similar hydrocarbon homologs of lower boiling point, if suitably extensive countercurrent contact of the gas mixture and solid adsorbent is provided to supply the necessary stages for the removal of the higher boiling hydrocarbon to the extent desired. However, it is difficult to obtain selective desorption of any particular component from the adsorbent Each adsorbed component exercises its own vapor pressure and the gas composition in contact with the solid adsorbent thus tends to approach an equilibrium concentration for each adsorbed compound. Thus, under adsorption conditions, the solid adsorbent tends to adsorb appreciable quantities of each component present in the gas mixture, and under desorption conditions the adsorbent tends to release appreciable quantities of each compound which has been adsorbed. The lower boiling compounds of any particular chemical series are generally released more readily than the higher boiling compounds but under ordinary conditions, if both types of compounds have been adsorbed, the separation of the more volatile components in a state of high purity becomes very difficult. An even more difficult problem attends the concentration of an intermediate fraction from a mixture containing both more volatile and less volatile homologs.

The methods for accomplishing the preparation of intermediate fractions are dependent upon the nature of the desired fraction and the point at which it is withdrawn from the primary adsorption-rectification zone. These are described broadly in my copending application entitled "Fractionation with Solid Adsorbents," identified as Serial Number 721,114 now patent No. 2,495,842 filed of even date herewith, directed particularly to the preparation of pure intermediate fractions which are withdrawn from the primary column at a point below the feed level.

An object of the present invention is to provide an improved process and apparatus for accomplishing such separation of intermediate fractions in a state of high purity by means of a solid adsorbent from mixtures also containing compounds which are less readily adsorbed than the desired intermediate components and also containing compounds which are more readily adsorbed than the desired intermediate components.

These and other objects of this invention will be apparent from the following description of one method of its application in a process for fractionation of a mixture of hydrocarbon gases by means of granular activated carbon.

A suitable apparatus for use in this process is shown diagrammatically in sectional elevation in the attached drawing.

Referring to the drawing, a hopper 1 is supplied with a suitable granular adsorbent, for example with granular activated carbon such as steam activated cocoanut charcoal of a particle size of about 0.1 to 0.01 inch diameter by an adsorbent recycle line 2, which will be discussed below. This hopper supplies a tall cylindrical vessel 3 which is completely filled with the adsorbent. This vessel contains in its upper portion a bundle of vertical parallel cooling tubes 4 open at both ends. A cooling fluid such as water is circulated around the cooling tubes 4 from line 5. The vessel 3 also contains several gas distributing plates or baffles 6. It is provided with a feed line 7, a side stream withdrawal line 8, a heavy product withdrawal line 9 and with heating means such as heat transfer tubes 10 and a stripping gas supply line 11.

The side stream fraction withdrawn from the rectification zone, column 3, in line 8, is passed into the lower portion of a secondary adsorption vessel 12. The upper portion of this vessel is supplied with adsorbent at a suitable temperature from any source. It may, for example, receive a portion of recycled adsorbent from the bottom of tower 3 by line 13. In this case the hot carbon is received in a hopper 14 at the top of the column and is passed through cooling tubes 15 into the adsorption zone of the tower 12 in which it serves to remove heavier or more readily adsorbed fractions than the desired intermediate fraction B from the side stream supplied by line 8. A concentrated intermediate fraction B of high purity is thus obtained at the top of the secondary adsorber and may be withdrawn through lines 16 and/or 28. A portion of this product may suitably be recycled in lines 18 and 13 as a carrier gas to return carbon from the bottom of tower 3 to hopper 14. The gas stream leaving this hopper in line 16 usually carries with it some dust or fines which are removed in separator 19 and the gas may be cooled in cooler 20 and recycled by means of blower 21.

The carbon leaving the bottom of vessel 12 is charged with both component B and heavier components C and requires desorption before reuse. This is accomplished with increased recovery of the intermediate component B by returning the charged carbon from vessel 12 to the rectification zone of vessel 3, using valve 22 and line 23. While this could be accomplished by any suitable type of mechanical conveyor, the forcing of the granular carbon through an Archimedian screw or similar device involves some breakage of the particles with the formation of dust or fines. It is preferable to avoid the application to the carbon of mechanical compressive or abrasive forces such as are encountered in the use of force feed devices of this type. The device illustrated is designed to permit introduction of carbon into the lower portion of vessel 3 from both the upper portion of that vessel and from vessel 12, utilizing only the force of gravity to move the carbon through valves 22 and 24. The latter valve is provided in a constricted portion 25 of the vessel 3 which is perforated or designed in the form of suitable louvers to permit passage of gases upwardly, but to prevent passage of solid downwardly.

The valves 24 and 22 thus control the relative flow of adsorbent through the main adsorption tower 3 and the side stream tower 12, respectively. When using this method of control of the carbon flow, the valves 26 and 27 are operated so as to maintain a carbon level below the discharge of line 23 and of valve 24 in order to permit free flow of carbon. These valves, also 22 and 24, may be of any suitable construction to control the flow of solids, such as rotating star valves or reciprocating feeder valves with offset supply and discharge tubes.

During long continued operation of the equipment, there may be a decrease in activity of the recycled adsorbent, especially if the feed contains sulfur or resin forming diolefins. In such cases the adsorbent may be regenerated by heating to high temperatures of about 1000–1200° F. in the presence of steam or flue gas either in an intermediate operation or by continuously passing a portion of the recycled adsorbent, as from line 2, through such a regeneration zone.

The carbon withdrawn through valve 26 is returned to the hopper 1 by any suitable methods, such as by suspension in a stream of inert or recycled unadsorbed gas 29 supplied at a sufficient velocity to provide a dilute suspension of carbon in the resulting gas mixture, this suspension being passed through line 2 into the upper portion of the hopper 1 which is suitably constructed in the form of a separator so that the entrained carbon separates in this hopper and the gas passes out at the top through line 30. Entrained dust or fines are separated from this gas in the separator 31 and the gas may then be cooled if desired in cooler 32. A portion of this gas may be recycled by blower 33 to line 29, the remaining unadsorbed gas being withdrawn through line 34. The unadsorbed components A of the feed gas may be passed up through the cooler 4 into the hopper 1 and/or may be withdrawn through line 35. At least a portion of the unadsorbed gas is preferably passed up the coolers 4 and 15 in order to displace any water vapor from the descending carbon before it is cooled.

In the operation of the equipment illustrated in the figure, as will be discussed more fully below, the feed stream enters at line 7, the fraction B of intermediate volatility or ease of adsorption is recovered in concentrated form in line 28 or 17, while more volatile and more readily desorbed components A are obtained in line 35, if it is desired to use this line, and in line 34. These components may also be separated by means of an adsorbent side stream unit as described in my copending application, mentioned above. Fractions less volatile and more readily adsorbed than the desired intermediate fraction B are recovered as fraction C in line 9. One or more additional vapor side stream fractions may be withdrawn from the rectification zone at any desired point between the feed line 7 and line 9.

The flow of the adsorbent downwardly through the equipment has been described above. The fractionation of feed mixtures in conjunction with such operation will now be described. The examples given are solely for purpose of illustration and the invention is not to be limited to the particular operating conditions stated, as these vary with the nature of the feed and the adsorbent.

Referring to the figure, a feed gas mixture containing methane, the $C_2$ hydrocarbons, ethane and ethylene, and the $C_3$ hydrocarbons, propane and propylene, is supplied by line 7 to the bottom of the adsorption zone in vessel 3, at which point the carbon may have a temperature of about 175° F. with the tower operated at a moderate pressure of about 1 to 4 atmospheres. This gas passes up through the adsorber section of vessel 3 and substantially all of the $C_2$ and $C_3$ hydrocarbons are adsorbed therein. The unadsorbed gases, methane and a portion of the $C_2$ hydrocarbons, pass out through line 35 or up through hopper 1, as desired, leaving through lines 30 and 34. The temperature of the granular activated adsorbent carbon entering the adsorber from the cooling tubes 4 is about 100 to 120° F. A portion of the unadsorbed gas passing upwardly through the tubes 4 sweeps out any steam being brought down with the hot carbon from the hopper 1 and thus prevents condensation of water on the carbon as it is cooled.

In order to obtain an intermediate fraction of substantially pure $C_2$ hydrocarbons, the vapor side stream 8 is withdrawn from the tower 3 at a point sufficiently below the feed for this stream to be substantially free of methane and lighter components. This point is suitably the level at which the $C_2$ hydrocarbons are at their maximum concentration. A lower point of withdrawal than this level may be used, at some expense in capacity, when rigid exclusion of methane is desired. Auxiliary heating means 36 may also be provided in the rectification zone above line 8 in order to aid the rejection of methane and lighter components from this zone. The side stream 8 is passed upwardly through the secondary adsorber 12 countercurrent to descending carbon at a temperature of about 150 to 200° F. The carbon and gas flow rates are adjusted to permit substantially complete adsorption of $C_3$ hydrocarbons, leaving substantial proportions of the entering $C_2$ hydrocarbons unadsorbed. These are withdrawn through lines 28 and/or 16 in highly concentrated form. The charged carbon, containing adsorbed $C_2$ and $C_3$ hydrocarbons, is passed from adsorber 12 through line 23 to the lower portion of the rectification zone of column 3 where it is mixed with similarly charged carbon descending through valve 24. The carbon is heated in this rectification zone by rising $C_3$ hydrocarbons which are desorbed by heating the carbon in tubes 10 to a temperature of about 400–550° F. and/or by stripping it with steam supplied by line 11. A portion of the desorbed $C_3$ hydrocarbons is withdrawn in line 9 as the heavy product stream and the remainder passes upwardly through the rectification zone to displace $C_2$ and lighter hydrocarbons from the descending carbon.

Any hydrogen present in the feed gas will be removed along with the methane in lines 30 and 35 in the above-described operation, while $C_4$ and heavier hydrocarbons will be removed along with the $C_3$ hydrocarbons in line 9.

The process as described above is also applicable to the treatment of other hydrocarbon mixtures and other gas or vapor mixtures in general containing three or more components of different degrees of adsorption. For example, the process of this invention may also be applied to the separation of an intermediate $C_3$ fraction of high purity in lines 28 and/or 17 from a mixture containing $C_2$ and $C_4$ hydrocarbons in which case the $C_2$ and any lighter hydrocarbons may be removed from the upper portion of the primary adsorption zone, the vapor side stream 8 compromises $C_3$ and heavier hydrocarbons, and the heavy fraction C removed in the product stream 9 comprises $C_4$ and any heavier hydrocarbons present. Such a fraction, for example, may contain methane, ethane, ethylene, propane, propylene, butanes, butylenes, pentanes and pentenes.

An example of suitable operating conditions for conducting the process as described above, with particular reference to the figure, is as follows:

The tower 3 is 12 feet in diameter and 60 feet high between the heating and cooling sections, each of which consists of a vertical tube bundle 20 feet long of adequate area for the heat transfer required. The secondary tower 12 is 40 feet high, including a 20-foot cooling tube bundle 15, and is 10 feet in diameter.

Carbon is supplied to the hopper 1 at a rate of 177 tons per hour, and to the hopper 14 at a rate of about 50 to 95 tons per hour, depending upon the amount of internal reflux in the rectification zone of tower 3 and the rigidity with which $C_3$ hydrocarbons are to be excluded from the $C_2$ fraction in line 28. This carbon is passed through valve 22 into tower 3. 673,000 cubic feet per hour (60° F. and one atm.) of a feed gas described below are supplied through line 7 at 30 p. s. i. g., the columns being operated to take only the necessary pressure drop without disturbance of the steady downward flow of carbon in each tower.

Thus, tower 3 is maintained at a top pressure of about 20 p. s. i. g. and a bottom pressure of about 40 p. s. i. g. and tower 12 is maintained at an intermediate pressure. The coolers and heaters are operated to maintain the carbon leaving cooler 4 at about 120° F. and that leaving cooler 15 at about 150° F. The carbon is heated by heater 10 to about 550° F., thus providing a temperature of about 230° F. at the connection with line 9 so that substantially all of the stripping steam supplied by line 11 is withdrawn with heavy product in this line. Under these conditions the temperature at the point of withdrawal of the intermediate cut at line 8 will be about 180° F.

Analyses of an illustrative feed gas mixture and of the product fractions which may be produced when operating under these conditions are as follows:

| Component | Feed Gas (Line 7) | Unadsorbed Gas (Lines 30 and 35) | $C_2$ Cut (Line 28) | $C_3$+Cut (Line 9) |
|---|---|---|---|---|
| $H_2$ | 10.5 | 24.4 | | |
| $CH_4$ | 30.4 | 69.9 | 1.0 | |
| $C_2H_6$ | 9.4 | 2.2 | 27.3 | |
| $C_2H_4$ | 23.4 | 3.5 | 70.5 | 0.9 |
| $C_3H_8$ | 7.0 | | 1.1 | 25.4 |
| $C_3H_6$ | 16.0 | | 0.1 | 61.0 |
| $C_4$ | 1.8 | | | 6.9 |
| $C_5$ | 0.2 | | | 0.8 |
| $C_{6+}$ | 1.3 | | | 5.0 |
| Production (ft.³/hr. (×1000)) | 673 | 290 | 208 | 175 |

As indicated above, these conditions are designed to produce intermediate cuts containing very small amount of higher boiling olefins. This is especially desirable in concentrating unsaturated hydrocarbon fractions for the production of pure synthetic alcohols as by hydration with sulfuric acid. For example, all propylene is excluded as rigidly as possible from the $C_2$ cut and butenes are similarly excluded from the $C_3$ cut, when the tower 12 is used to produce a purified $C_3$ cut. Even more rigid fractionation may be accomplished by suitably increasing the height of the rectification zones and by operating with higher internal "reflux ratios" in these zones.

It is recognized that all the gas streams described above which are withdrawn from contact with the carbon will contain appreciable quantities of dust or fines and that suitable dust separators are desirably included in such gas lines before the gas is passed through the exit flow control valves. Suitable condensers and separators may also be provided where the gas contains readily condensable constituents such as $C_4$ or heavier hydrocarbons, water vapor and the like. These have been omitted from the drawings for purpose of simplicity.

The operation described above is designed particularly for use with granular particles of the adsorbent which completely fill the vessels described and which, except for the slow, downward motion attending passage through these vessels, undergo no other type of motion. The rising streams of feed and stripping gases or vapors under such cases are held at rates below those causing partial lifting or vibration of the solid particles. Such rates are suitably controlled by maintaining a pressure drop across the bed of solid adsorbent which is less than, and is preferably not more than .5 to .7 times the weight of, the bed expressed in the same units. Higher gas velocities attending pressure drops equal to or slightly greater than the weight of the bed, cause partial lifting and vibration or even intense turbulent motion of the solid particles which resembles that of a boiling liquid.

The process can also be conducted with the particles in such vibratory or "fluidized" motion, if suitable baffles or plates represented by the numeral 37 are provided to localize the motion of any particular particle. Using finely divided adsorbent in the form of a powder of about 100–300 mesh, for example, the vessels 3 and 12 can be constructed in the form of ordinary bubble towers, the plates serving to limit the swirling action of the solids to a very small portion of the total height of the column and thus to provide for the necessary overall countercurrent motion of gases and solids which is required for separation of the feed stream into fractions of high purity. Even where such vibratory or fluidized motion is not used throughout the entire columns, it is advantageous in the heating and cooling tubes in order to increase their efficiency, as a slowly moving, non-vibrating solid bed is extremely difficult to heat or cool by indirect means because of its low heat conductivity. The gas velocities causing such vibratory or fluidized motion will vary with the size and density of the solid particles. In general, upward gas velocities below about 1.5 feet per second do not cause such motion with solid adsorbents having a particle size greater than 500 microns and having a bulk density between about 25 and 50 pounds per cubic foot. Upward gas velocities above about two feet per second are sufficient to cause partial lifting of such solid particles, resulting in vibration, the preferred gas velocities for such motion without intensive turbulence being between 2 and 5 feet per second. At higher velocities up to about 15 feet per second and the solid particles assume a state of intense turbulence, resembling that of a boiled fluid, but are not completely entrained in the rising gas stream; that is, downward motion of the particles countercurrent to the rising gas stream is still possible. At still higher gas velocities the particles are entrained in the rising gas stream and lifted to such an extent that no substantial downward flow of the particles occurs and countercurrent flow of the solid and gas becomes impossible.

It will be understood that these operating conditions are presented for illustrative purposes and that suitable operating conditions will vary widely with the size and density of the solid material and with the operating temperatures and pressures used. In general, when operating with vibratory or fluidized solids, much larger gas and solid disengaging zones should be supplied than are suitable with non-vibrating solids and larger dust collectors should also be used, with provisions for return of the separated solids to the columns. This may be accomplished by injecting them with a gas stream such as the feed gas or the stripping gases or steam, or by the use of a screw conveyor such as an Archimedian screw.

The above-described processes may be conducted with solid adsorbent particles ranging from about 300 mesh up to about ¼ inch or larger and is preferably conducted with particles that will flow freely through a vertical tube without agitation. It is generally desirable to use particles of fairly uniform size in order to avoid solid segregation or elutriation effects.

The invention is generally applicable to fractionation processes of the type illustrated above, involving selective adsorption of one or more components from a mixture containing other components which are more and less readily adsorbed. In such operations it may be used to separate hydrocarbon mixtures into fractions of any desired boiling range or chemical structure by suitable selection of adsorbents and stripping agents in conformity with chromatographic principles. For example, paraffins, naphthenes, olefins, diolefins and aromatics may be obtained as separate fractions from mixtures of two or more of these classes of hydrocarbons with a silica gel adsorbent used in an adsorption process as described above in one or more stages according to the number of fractions to be separated. Similarly, organic vapors of different degrees of polarity may also be separated by selective adsorption on any suitable solid adsorbents.

While the process has been described above as conducted with a single solid adsorbent, it may also be conducted with mixtures of different types of solid adsorbents designed to supplement each other in accomplishing the separations desired. Thus, a mixture of activated carbon and silica gel may be used for the treatment of moist hydrocarbon gases, the silica gel serving to adsorb the water and to carry it down into the desorption zone while the charcoal serves to adsorb and fractionate the hydrocarbons. Similarly a mixture of activated carbon and solid cuprous chloride may be used in which advantage is taken of the increased adsorption capacity and selectivity of the cuprous chloride when dealing particularly with gases containing olefins and diolefins, and the activated charcoal is used to obtain greater recovery or "clean-up" of the desired hydrocarbons than is possible with the cuprous chloride alone, in view of the relatively high equilibrium partial pressures of the hydrocarbons under ordinary adsorption conditions over their cuprous chloride complexes.

I claim:

1. In a process for concentrating an intermediate fraction B from a fluid mixture also containing a less readily adsorbed component A and a more readily adsorbed component C by means of a granular solid adsorbent, comprising passing said adsorbent downwardly through a primary column having a primary adsorption zone above the feed and primary rectification and desorption zones below the feed, removing desorbed component C from said primary desorption zone while passing a portion of desorbed component C upwardly through said primary rectification zone to displace component B from the descending adsorbent therein, and removing substantially all of the component A from the upper portion of said primary adsorption zone, the improvement which comprises removing a vapor side stream comprising components B and C and substantially free of component A from said primary rectification zone and passing said vapor side stream upwardly through a secondary adsorption zone countercurrent to a descending adsorbent which adsorbs component C, while leaving a substantial proportion of component B unadsorbed and removing such unadsorbed component B in a state of high purity from the upper portion of said secondary adsorption zone, passing the charged adsorbent containing components B and C from said secondary adsorption zone into said primary rectification zone.

2. The process according to claim 1, in which a portion of the desorbed adsorbent leaving the bottom of said primary desorption zone is supplied to the top of said secondary adsorption zone.

3. Process according to claim 1, in which a portion of the desorbed adsorbent leaving the bottom of said primary adsorption zone is returned to the top of said secondary adsorption zone by entrainment in a stream of recycled product B leaving said secondary adsorption zone.

4. Process according to claim 1, in which a portion of the desorbed adsorbent leaving the bottom of said primary desorption zone is returned to the top of said primary adsorption zone by entrainment in a recycled stream of unadsorbed gas leaving the upper portion of said primary adsorption zone and a second portion of said desorbed adsorbent leaving the bottom of said primary desorption zone is separately returned to the top of said secondary adsorption zone by entrainment in a recycle stream of product B leaving the upper portion of said secondary adsorption zone.

5. Process according to claim 1, in which a portion of the desorbed adsorbent leaving the bottom of said primary desorption zone is returned to the top of said primary adsorption zone and a second portion of said desorbed adsorbent is returned to the top of said secondary adsorption zone.

6. In a process for preparing a fraction of $C_2$ hydrocarbons from a gas mixture containing $C_1$ to $C_3$ hydrocarbons, comprising passing a granular solid adsorbent downwardly through a primary column having a primary adsorption zone above the feed and primary rectification and desorption zones below the feed, removing a product stream comprising desorbed $C_3$ hydrocarbons from said primary desorption zone while passing a portion of said desorbed $C_3$ hydrocarbons upwardly through said primary rectification zone to displace $C_2$ hydrocarbons and methane from the descending adsorbent therein, and removing unadsorbed gas comprising substantially all of the methane in the feed mixture from the upper portion of said primary adsorption zone, the improvement which comprises removing a vapor side stream comprising $C_2$ and $C_3$ hydrocarbons and substantially free of methane from said primary rectification zone and passing it upwardly countercurrent to descending adsorbent in a secondary adsorption zone, passing granular solid adsorbent downwardly through said secondary adsorption zone to adsorb substantially completely the $C_3$ hydrocarbons supplied thereto while leaving a substantial proportion of the $C_2$ hydrocarbons unadsorbed, removing said unadsorbed $C_2$ hydrocarbons as a separate stream in a state of high purity from said secondary adsorption zone, passing the charged adsorbent containing $C_2$ and $C_3$ hydrocarbons leaving the lower portion of said secondary adsorption zone into said primary rectification zone.

7. Process according to claim 6, in which said feed gas mixture also contains $C_4$ hydrocarbons which are adsorbed with the $C_3$ hydrocarbons in said primary adsorption zone, are desorbed in said primary desorption zone, and are removed therefrom at a point not higher than the said product stream of desorbed $C_3$ hydrocarbons.

8. Process according to claim 6, in which said feed gas mixture also contains hydrogen which is removed in the unadsorbed gas from the upper portion of said primary adsorption zone.

9. Process according to claim 6 in which said feed gas mixture comprises methane, ethane, ethylene, propane and propylene.

10. Process according to claim 6, in which said feed gas mixture comprises methane, ethane, ethylene, propane, propylene, butanes and butenes.

11. In a process for separating a $C_3$ hydrocarbon fraction from a gas mixture containing $C_2$ to $C_4$ hydrocarbons, comprising passing a granular solid adsorbent downwardly through a primary column having a primary adsorption zone above the feed and primary rectification and desorption zones below the feed, removing desorbed $C_4$ hydrocarbons from said primary desorption zone while passing a portion of said desorbed $C_4$ hydrocarbons upwardly through said primary rectification zone to displace $C_2$ and $C_3$ hydrocarbons from the descending adsorbent therein, and removing substantially all the $C_2$ hydrocarbons from the upper portion of said adsorbtion zone, the improvement which comprises removing a vapor side stream comprising $C_4$ and $C_3$ hydrocarbons and substantially free of $C_2$ and lighter hydrocarbons from said primary rectification zone and passing it upwardly countercurrent to descending adsorbent in a secondary adsorption zone, passing granular solid adsorbent downwardly through said secondary adsorption zone to adsorb substantially completely the $C_4$ hydrocarbons supplied thereto while leaving a substantial proportion of the $C_3$ hydrocarbons unadsorbed, removing said unadsorbed $C_3$ hydrocarbons as a separate stream in a state of high purity from the upper portion of said secondary adsorption zone and passing the charged adsorbent containing $C_3$ and $C_4$ hydrocarbons leaving the lower portion of said secondary adsorption zone into said primary rectification zone at a point below the point of withdrawal of the vapor sidestream therefrom.

12. Process according to claim 11, in which said feed gas mixture also contains methane which is removed as unadsorbed gas from the upper portion of said primary adsorption zone.

13. Process according to claim 11, in which said feed gas mixture also contains $C_5$ hydrocarbons which are adsorbed with the $C_4$ hydrocarbons in said primary adsorption zone, are desorbed in said primary desorption zone and are removed therefrom at a point not higher than the said product stream of desorbed $C_4$ hydrocarbons.

14. Process according to claim 11 in which said feed gas mixture comprises ethane, ethylene, propane, propylene, butanes and butylenes.

15. Process according to claim 13, in which said feed gas mixture comprises ethane, ethylene, propane, propylene, butanes, butylenes, pentanes and pentenes.

EDWIN R. GILLILAND.

REFERENCES CITED

The following references are of record in the file of this patent:

UNITED STATES PATENTS

| Number | Name | Date |
|---|---|---|
| 1,422,007 | Soddy | July 4, 1922 |
| 1,957,818 | Carney | May 8, 1934 |
| 2,369,559 | Gilliland | Feb. 13, 1945 |
| 2,388,732 | Finsterbusch | Nov. 13, 1945 |

OTHER REFERENCES

"Hypersorption Process for Separation of Light Gases," Clyde Berg. A. I. Ch. E. Transactions, vol. 42, #4, August 25, 1946, pages 665 to 680.